US006973503B2

(12) United States Patent
Basso et al.

(10) Patent No.: US 6,973,503 B2
(45) Date of Patent: Dec. 6, 2005

(54) PREVENTING AT LEAST IN PART CONTROL PROCESSORS FROM BEING OVERLOADED

(75) Inventors: Claude Basso, Raleigh, NC (US); Max Robert Povse, Apex, NC (US); Natarajan Vaidhyanathan, Greensboro, NC (US); Colin Beaton Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 706 days.

(21) Appl. No.: 10/155,675

(22) Filed: May 23, 2002

(65) Prior Publication Data

US 2003/0221015 A1    Nov. 27, 2003

(51) Int. Cl.[7] ............................................. G06F 13/00
(52) U.S. Cl. ...................... 709/232; 709/224; 370/235
(58) Field of Search ............................... 709/200–202, 709/220–224, 230–234; 370/235, 392

(56) References Cited

U.S. PATENT DOCUMENTS

| 5,748,905 A | 5/1998 | Hauser et al. ......... 395/200.79 |
| 6,496,832 B2 | 12/2002 | Chi et al. |
| 6,611,519 B1 * | 8/2003 | Howe .......................... 370/386 |
| 6,687,247 B1 * | 2/2004 | Wilford et al. ............. 370/392 |
| 6,768,716 B1 * | 7/2004 | Abel et al. ................... 370/230 |
| 2002/0178184 A1 | 11/2002 | Kuchinsky et al. |

FOREIGN PATENT DOCUMENTS

| WO | WO0116682 A1 | 3/2001 |
| WO | WO0116777 A1 | 3/2001 |
| WO | WO0117179 A1 | 3/2001 |
| WO | WO0147207 A2 | 6/2001 |
| WO | WO0150259 A1 | 7/2001 |
| WO | WO0177849 A2 | 10/2001 |
| WO | WO0178308 A2 | 10/2001 |

OTHER PUBLICATIONS

U.S. Application No. 10/033,823, filed /19/2001, pending.
U.S. Application No. 10/154,529, filed May 22, 2002, pending.
U.S. Appl. No. 10/555,616, filed May 22, 2002, pending.
U.S. Appl. No. 10/155,405, filed May 22, 2002, pending.
U.S. Appl. No. 10/155,304, filed May 22, 2002, pending.
U.S. Appl. No. 10/154,524, filed May 22, 2002, pending.
U.S. Appl. No. 10/642,376, filed Aug. 14, 2003, pending.
U.S. Appl. No. 10/641,492, filed, Aug. 14, 2003, pending.

* cited by examiner

Primary Examiner—Moustafa M. Meky
(74) Attorney, Agent, or Firm—Robert A. Voigt, Jr.; Winstead Sechrest & Minick P.C.

(57) ABSTRACT

A method, system and computer program product for preventing at least in part overloading of a control processor. A network device may comprise at least one network processor and at least one control processor. The control processor may be configured to process slow path packets that are redirected from a network processor to the control processor. The control processor may configure control blocks to determine if the bandwidth for the control processor will be exceeded by the network processor transferring another slow path packet to the control processor. If the control block determines that transmitting the slow path packet would exceed the processing capacity of the control processor, then the control block may generate a result indicating for the network processor to discard the received packet. By discarding packets that exceed the processing capacity of the control processor, overloading of the control processor may at least in part be prevented.

15 Claims, 5 Drawing Sheets

PREVENTING AT LEAST IN PART CONTROL PROCESSORS FROM BEING OVERLOADED

TECHNICAL FIELD

The present invention relates to the field of network processor based networking devices, and more particularly to limiting the amount of traffic being forwarded to control processors thereby preventing at least in part the control processors from being overloaded.

BACKGROUND INFORMATION

Network systems such as a packet switching network system typically distribute packets or frames of data using network devices such as routers and switches. A network device may comprise at least one processor commonly referred to as a "network processor." The network processor may be configured to process packets that are commonly referred to as "fast path packets." Fast path packets may refer to packets, e.g., Internet Protocol (IP) packets, that are to be switched or routed to another switch or router.

A network device, e.g., router, switch, may further comprise at least one processor commonly referred to as a "control processor." The control processor may be configured to manage the overall operation of the router or switch. For example, the control processor may initialize the network processor(s), download boot or diagnostic code and install operational code on the network processor(s). Furthermore, control processors may be configured to process packets that are commonly referred to as "slow path packets" which require more complicated operations than fast path packets. Slow path packets may refer to packets that are redirected from network processor(s) to control processor(s) to be processed by the control processor(s). For example, slow path packets may include packets that cannot be handled by the network processors, e.g., Internet Protocol (IP) packets with options, packet implementing Border Gateway Protocol (BGP) routing protocol, packet implementing Open Shortest Path First (OSPF) routing protocol.

Upon the network processors receiving slow path packets, the network processors may route these slow path packets to the appropriate control processor(s) for servicing. However, the rate at which slow path packets may be routed to control processors, i.e., the amount of data transmitted to control processors, may exceed the control processors capability of processing them. That is, the control processors may be overloaded with packets to be serviced thereby causing the device, e.g., router, switch, to crash. Overloading of the control processors may be prevented at least in part by limiting the amount of traffic, i.e., the traffic rate, to be forwarded to the control processors.

It would therefore be desirable to limit the amount of traffic being forwarded to control processors thereby preventing at least in part control processors from being overloaded.

SUMMARY

The problems outlined above may at least in part be solved in some embodiments by configuring policer control blocks to determine if a user selected bandwidth for a control processor will be exceeded by transferring another slow path packet to the control processor. A policer control block may refer to a software or hardware entity that is configured to measure a particular data transmission rate to a particular control processor to determine if the data rate to the control processor exceeds a user selectable bandwidth limit. Upon the network processor receiving a slow path packet, the slow path packet may be routed to a policer control block associated with the appropriate control processor for servicing that slow path packet. If the policer control block determines that transmitting the slow path packet would exceed the processing capacity of the control processor, then the policer control block may generate a result indicating for the network processor to discard the received packet. By discarding packets that exceed the processing capacity of the control processor, overloading of the control processor may at least in part be prevented.

In one embodiment of the present invention, a method for preventing at least in part overloading of a control processor coupled to a network processor in a network device, e.g., router, may comprise the step of the control processor configuring a table storing a listing of a plurality of slow path packets along with a plurality of associated actions to be performed on these slow path packets as described in greater detail below. The control processor may further configure a plurality of control blocks commonly referred to as "policer control blocks." A policer control block may refer to code that is configured to measure a particular data transmission rate to a particular control processor to determine if the data rate exceeds a user selectable bandwidth limit. In another embodiment, a policer control block may be implemented in hardware configured to measure a particular data transmission rate to a particular control processor to determine if the data rate exceeds a user selectable bandwidth limit. Each policer control block may be associated with a particular type of slow path packet as well as a particular control processor. For example, a policer control block may be configured to measure the data rate of slow path packets implementing the BGP routing protocol to a particular control processor in a network device, e.g., router, switch. It is noted that the step of configuring the table and policer control blocks may be performed by the control processor independently of the following listed activities performed by the network processor and policer control block.

Upon a network processor receiving a packet of data, e.g., Internet Protocol (IP) packet of data, a determination may be made by the network processor as to whether the received packet is a slow path packet and if so what type. In one embodiment, the network processor may be configured to determine if the received packet is a slow path packet including the type of slow path packet by reading the header of the received packet. For example, if the packet header contains an option that cannot be handled by the network processor, then the received packet may be deemed to be a slow path packet.

If the received packet is determined not to be a slow path packet, then the network processor may receive another packet of data. If the received packet is determined to be a slow path packet, then the following may occur.

The network processor may search the table configured independently by the control processor to determine the appropriate action to be performed on the received slow path packet. As stated above, the table may comprise a listing of a plurality of slow path packets not handled by the network processor along with a plurality of associated actions to be performed on that plurality of slow path packets. One of the following listed actions may be performed on the received slow path packet.

One action that may be performed by the network processor on the received packet is to discard the received packet. Another action that may be performed by the network processor is to discard the received packet as well as transmit a message to the control processor indicating that the received packet was discarded.

Another action that may be performed by the network processor is to transmit a packet length value to an appropriate policer control block. For example, the table, as discussed above, may have policer control blocks listed that are associated with particular types of slow path packets, e.g., slow path packet implementing the OSPF routing protocol. If the table indicates to transmit the length of the identified slow path packet to a particular policer control block, then the network processor may transmit the length of the received slow path packet to that particular policer control block.

Upon receiving the length of the received slow path packet, the policer control block may determine whether to transmit the received slow path packet to the control processor associated with the policer control block. If the policer control block determines that transmitting the slow path packet would not exceed the processing capacity of the control processor, then the policer control block may generate a result indicating for the network processor to transmit the received packet to the control processor. However, if the policer control block determines that transmitting the slow path packet would exceed the processing capacity of the control processor, then the policer control block may generate a result indicating for the network processor to discard the received packet. By discarding packets that exceed the processing capacity of the control processor, overloading of the control processor may at least in part be prevented.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

Although the present invention is described with reference to specific embodiments of a router preventing at least in part the overloading of its control processor(s), it is noted that the present invention may be implemented in any network device, e.g., switch, that comprises at least one control processor and at least one network processor. It is further noted that such embodiments implementing any network device comprising at least one control processor and at least one network processor would fall within the scope of the present invention.

Figure 1:
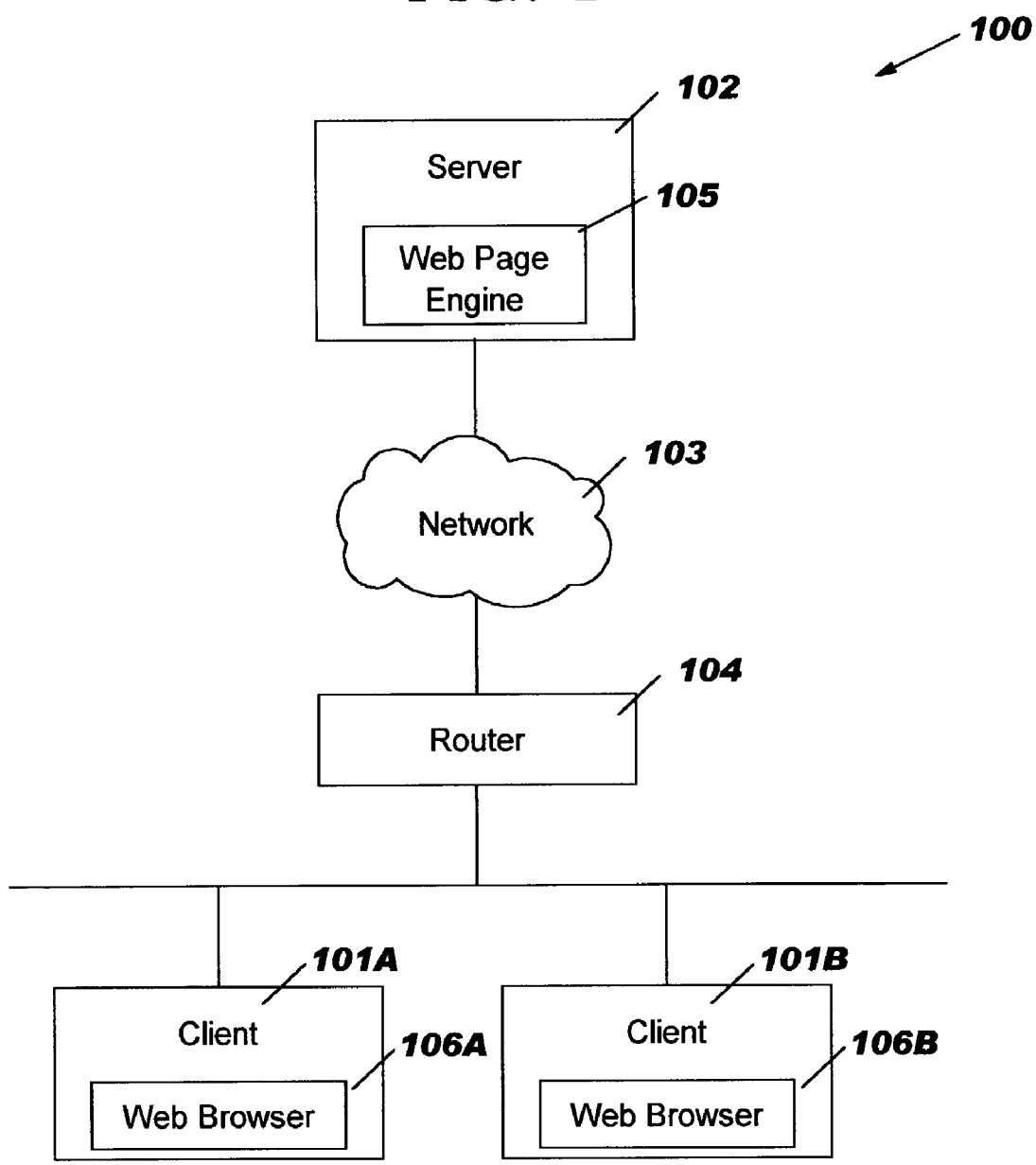
FIG. 1 illustrates an embodiment of a network system configured in accordance with the present invention.

FIG. 1—Network System

FIG. 1 illustrates one embodiment of the present invention of a network system 100. Network system 100 may comprise one or more clients 101A–B connected to a server 102 via a network 103. Network 103 may be a Local Area Network (LAN), e.g., Ethernet, Token Ring, ARCnet, or a Wide Area Network (WAN), e.g., Internet. A more detailed description of server 102 is provided further below in conjunction with FIG. 3. Network system 100 may further comprise a router 104 that may be coupled to one or more clients 101A–B. Router 104 may be configured to forward packets of information from the one or more clients 101A–B to network 103. Clients 101A–B may collectively or individually be referred to as clients 101 or client 101, respectively. A more detailed description of client 101 is provided further below in conjunction with FIG. 2. A more detailed description of router 104 configured to prevent overloading at least in part of its control processor(s) is provided further below in conjunction with FIG. 4. It is noted that network system 100 may comprise any number of clients 101, any number of servers 102 as well as any number of routers 104 and that FIG. 1 is illustrative. It is further noted that network system 100 may comprise any number of routers 104 that may be coupled to other devices, e.g., server 102, other routers 104, etc., than illustrated. It is further noted that the connection between clients 101 and network 103 may be any medium type, e.g., wireless, wired. It is further noted that client 101 may be any type of device, e.g., wireless, Personal Digital Assistant (PDA), cell phone, personal computer system, workstation, Internet appliance, configured with the capability of connecting to network 103 and consequently communicating with server 102. It is further noted that FIG. 1 is not to be limited in scope to any one particular embodiment. For example, router 104 may be any network device, e.g., switch, that comprises at least one network processor and at least one control processor.

Referring to FIG. 1, server 102 may comprise a web page engine 105 for maintaining and providing access to an Internet web page which is enabled to forward static web pages as well as web pages to a web browser 106 of client 101 via network 103. Each client 101A–B may comprise a web browser 106A–B, respectively, which may be configured for communicating with network 103 and for reading and executing web pages. Browsers 106A–B may collectively or individually be referred to as browsers 106 or browser 106, respectively. While the illustrated client engine is a web browser 106, those skilled in the art will recognize that other client engines may be used in accordance with the present invention.

Figure 2:
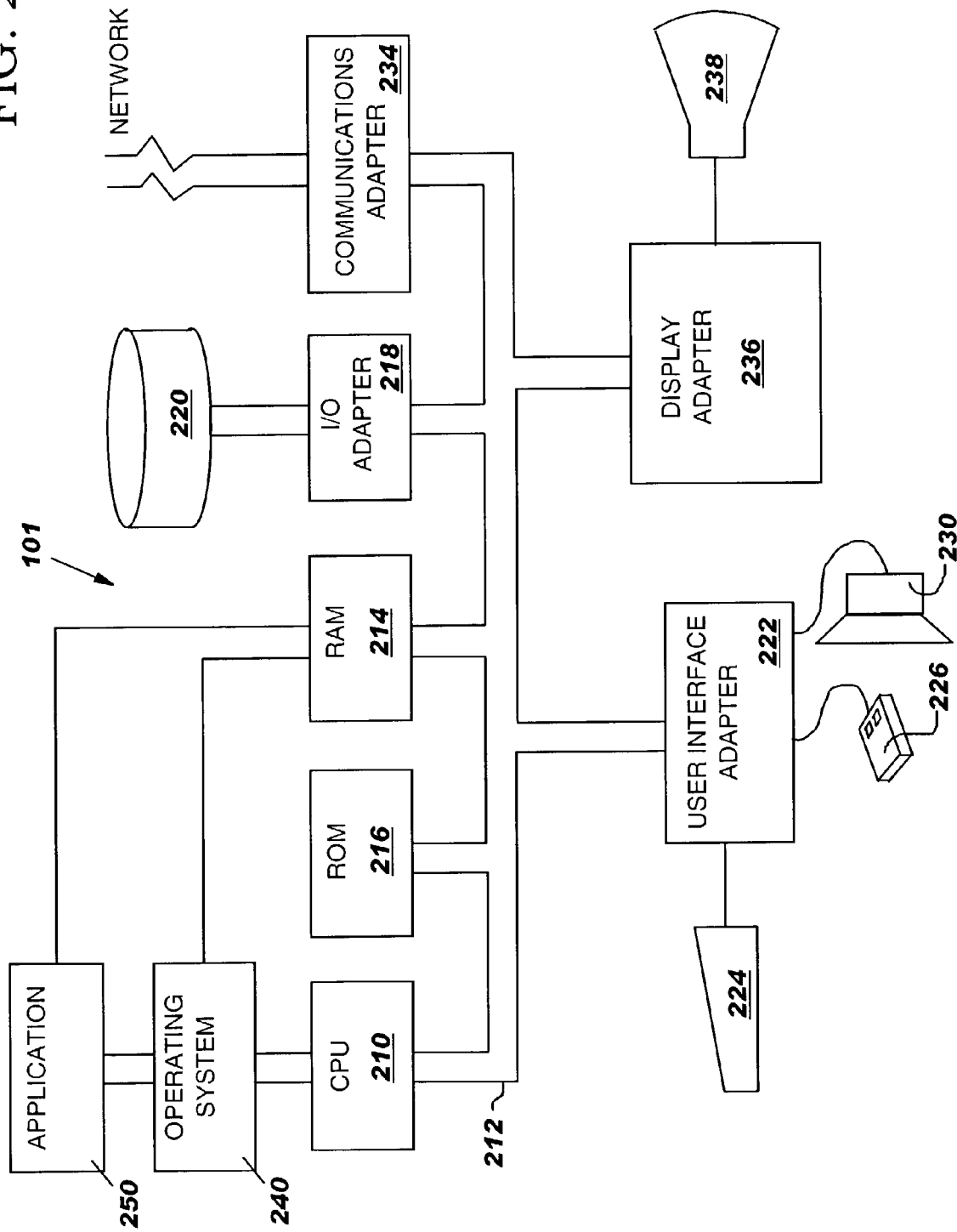
FIG. 2 illustrates an embodiment of a client in the network system configured in accordance with the present invention.

FIG. 2—Hardware Configuration of Client

FIG. 2 illustrates a typical hardware configuration of client 101 (FIG. 1) which is representative of a hardware environment for practicing the present invention. Client 101 may have a central processing unit (CPU) 210 coupled to various other components by system bus 212. An operating system 240 may run on CPU 210 and provide control and coordinate the functions of the various components of FIG. 2. An application 250 in accordance with the principles of the present invention may run in conjunction with operating system 240 and provide calls to operating system 240 where the calls implement the various functions or services to be performed by application 250. Application 250 may include, for example, a web browser. Read-Only Memory (ROM)

216 may be coupled to system bus 212 and include a Basic Input/Output System ("BIOS") that controls certain basic functions of client 101. Random access memory (RAM) 214 and Input/Output (I/O) adapter 218 may also be coupled to system bus 212. It should be noted that software components including operating system 240 and application 250 may be loaded into RAM 214 which may be client's 101 main memory for execution. I/O adapter 218 may be a small computer system interface ("SCSI") adapter that communicates with a disk unit 220, e.g., disk drive. It is noted that the web browser may reside in disk unit 220 or in application 250.

Referring to FIG. 2, client 101 may further comprise a communications adapter 234 coupled to bus 212. Communications adapter 234 may enable client 101 to communicate with server 102 (FIG. 1), router 104 (FIG. 1). I/O devices may also be connected to system bus 212 via a user interface adapter 222 and a display adapter 236. Keyboard 224, mouse 226 and speaker 230 may all be interconnected to bus 212 through user interface adapter 222. Event data may be inputted to client 101 through any of these devices. A display monitor 238 may be connected to system bus 212 by display adapter 236. In this manner, a user is capable of inputting to client 101 through keyboard 224 or mouse 226 and receiving output from client 101 via display 238.

Figure 3:
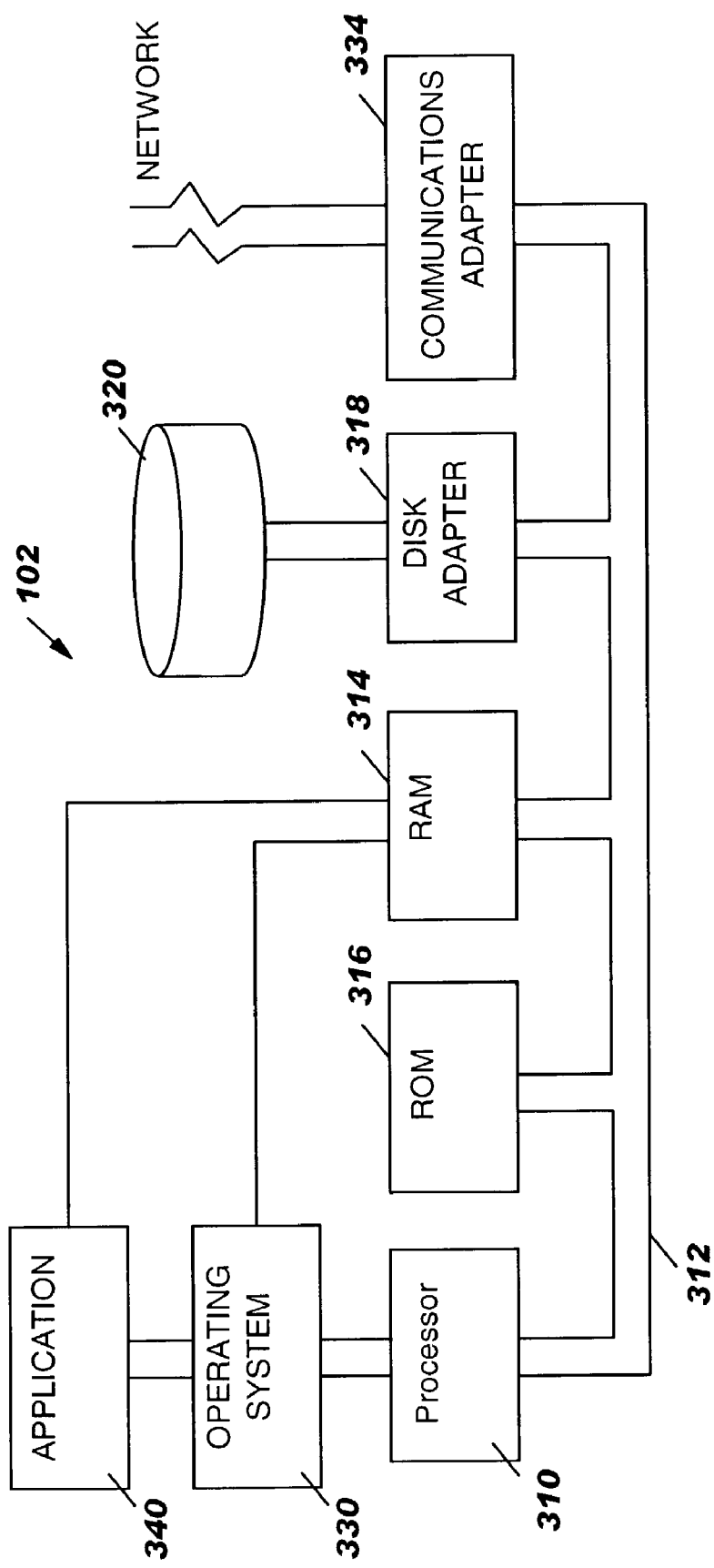
FIG. 3 illustrates an embodiment of a server in the network system configured in accordance with the present invention.

FIG. 3—Hardware Configuration of Server

FIG. 3 illustrates an embodiment of the present invention of server 102 (FIG. 1). Referring to FIG. 3, server 102 may comprise a processor 310 coupled to various other components by system bus 312. An operating system 330 may run on processor 310 and provide control as well as coordinate the function of the various components of FIG. 3. An application 340 in accordance with the principles of the present invention may run in conjunction with operating system 330 and provide calls to operating system 330 where the calls implement the various functions or services to be performed by application 340. An application 340 may include, for example, a program for operating a web site. Read-only memory (ROM) 316 may be coupled to system bus 312 and include a Basic Input/Output System ("BIOS") that controls certain basic functions of server 102. Random access memory (RAM) 314 and disk adapter 318 may also be coupled to system bus 312. It should be noted that software components including operating system 330 and application 340 may be loaded into RAM 314 which may be server's 102 main memory. Disk adapter 318 may be an adapter that communicates with disk unit 320, e.g., disk drive. Communications adapter 334 may also be coupled to system bus 312. Communications adapter 334 may interconnect bus 312 with an outside network enabling server 102 to communicate with client 101 via network 103.

Figure 4:
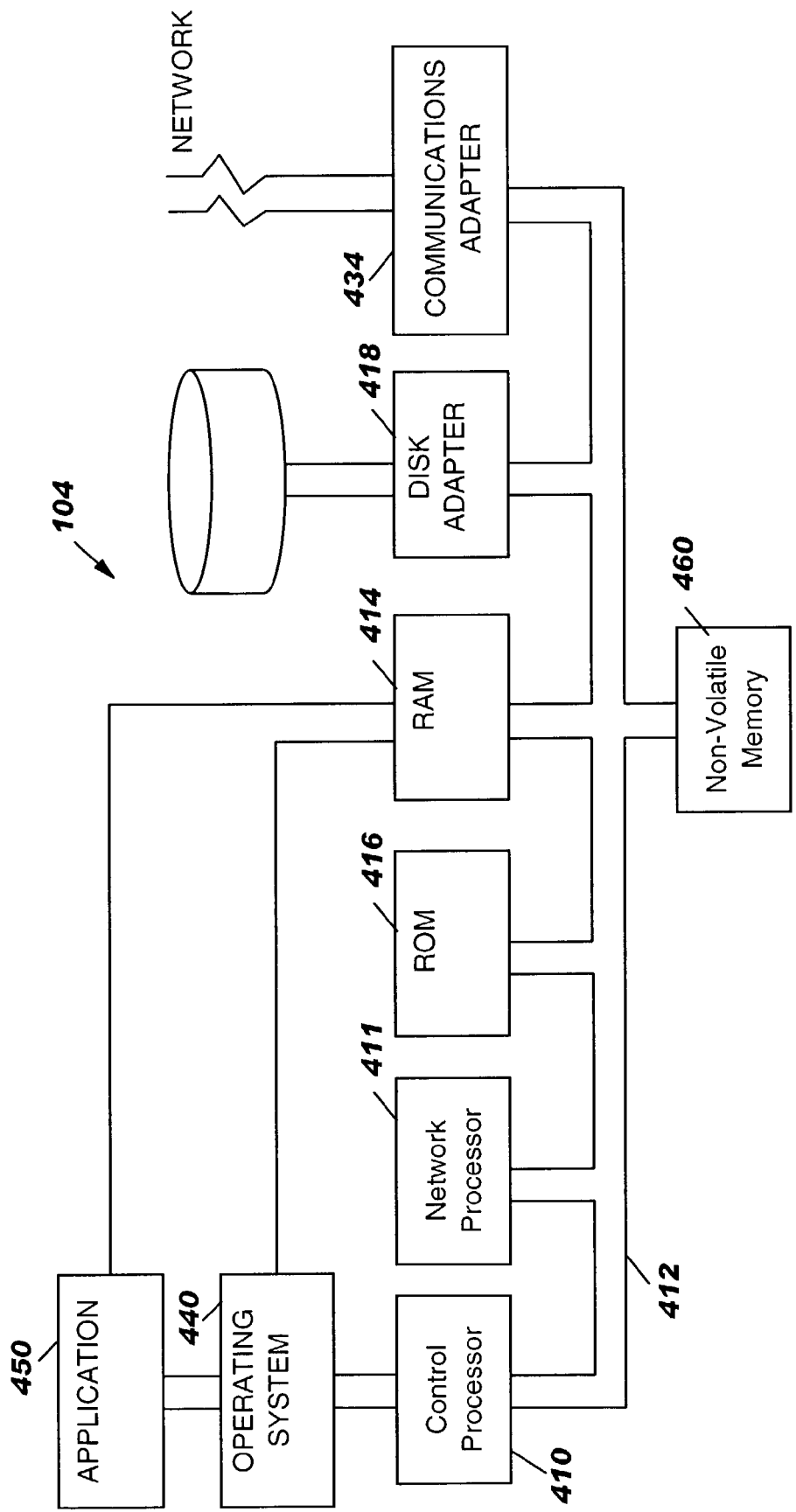
FIG. 4 illustrates an embodiment of a router in the network system configured in accordance with the present invention.

FIG. 4—Hardware Configuration of Router

FIG. 4 illustrates an embodiment of the present invention of router 104 (FIG. 1). Referring to FIG. 4, router 104 may comprise at least one control processor 410 and at least one network processor 411 coupled to various other components by system bus 412. Network processor 411 may be configured to process packets that are commonly referred to as "fast path packets." Fast path packets may refer to packets, e.g., Internet Protocol (IP) packets, that are to be routed to another router 104 or similarly configured network device, e.g., switch. Control processor 410 may be configured to manage the overall operation of router 104. For example, control processor 410 may initialize network processor 411, download boot or diagnostic code and install operational code on network processor 411. Furthermore, control processor 410 may be configured to process packets that are commonly referred to as "slow path packets" which require more complicated operations than fast path packets. Slow path packets may refer to packets that are redirected from network processor 411 to control processor 410 to be processed by control processor 410. For example, slow path packets may include packets that cannot be handled by network processor 411.

Referring to FIG. 4, an operating system 440, may run on control processor 410 and provide control and coordinate the functions of the various components of FIG. 4. An application 450 in accordance with the principles of the present invention may run in conjunction with operating system 440 and provide calls to operating system 440 where the calls implement the various functions or services to be performed by application 450. Application 450 may include, for example, a program for preventing at least in part overloading of control processor 410 as described in FIG. 5. Read-only memory (ROM) 416 may be coupled to system bus 412 and include a basic input/output system ("BIOS") that controls certain basic functions of router 104. Random access memory (RAM) 414, disk adapter 418 and communications adapter 434 may also be coupled to system bus 412. It should be noted that software components including operating system 440 and application 450 may be loaded into RAM 414 which may be the router's 104 main memory for execution. Disk adapter 418 may be a small computer system interface ("SCSI") adapter that communicates with a disk unit 420, e.g., disk drive. It is noted that the program of the present invention that prevents at least in part overloading of control processor 410, as described in FIG. 5, may reside in disk unit 420 or in application 450. Communications adapter 434 may interconnect bus 412 with network 103 enabling router 104 to communicate with client 101 (FIG. 1), server 102 (FIG. 1), other routers 104 or any other network device.

Router 104 may further comprise a non-volatile memory 460 coupled to bus 412. Non-volatile memory 460 may be configured to store a table containing a listing of a plurality of slow path packets not handled by network processor 411 along with a plurality of associated actions to be performed on these slow path packets as described in greater detail in conjunction with FIG. 5. Non-volatile memory 460 may further be configured to store code for policer control blocks as described in greater detail in conjunction with FIG. 5. It is noted that the table and the code for policer control blocks may also be stored in ROM 416, e.g., flash ROM, disk unit 420. It is further noted that the table and the code for policer control blocks may be stored in other storage units not illustrated and that such storage units would be known to a person of ordinary skill in the art. It is further noted that such storage units would fall within the scope of the present invention. It is further noted that policer control blocks may be implemented in hardware.

It is noted that router 104 may comprise any number of control processors 410 and network processors 411 and that FIG. 4 is illustrative. It is further noted that the program of the present invention may prevent at least in part overloading of any of the control processors 410 in router 104.

Implementations of the invention include implementations as a computer system programmed to execute the method or methods described herein, and as a computer program product. According to the computer system implementations, sets of instructions for executing the method or methods are resident in the random access memory 414 of one or more computer systems configured generally as described above. Until required by router 104, the set of instructions may be stored as a computer program product in another computer memory, for example, in disk drive 420 (which may include a removable memory such as an optical disk or floppy disk for eventual use in disk drive 420). Furthermore, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 5:
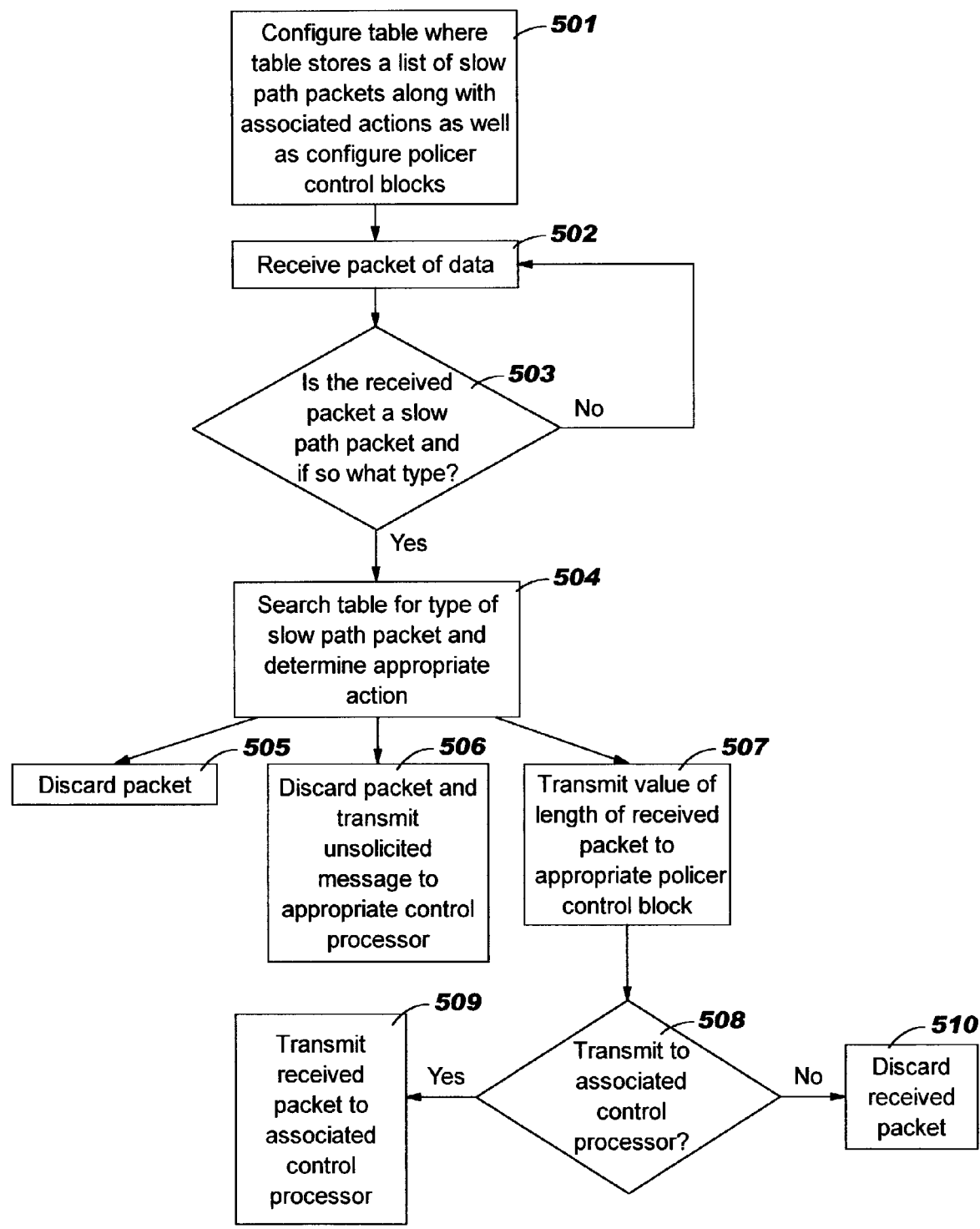
FIG. 5 is a flowchart of a method for preventing at least in part overloading of a control processor in accordance with the present invention.

FIG. 5—Method for Preventing at Least in Part Overloading of a Control Processor FIG. 5 is a flowchart of one embodiment of the present invention of a method 500 for preventing at least in part overloading of control processor 410 (FIG. 4). As stated in the Background Information section, upon the network processors receiving slow path packets, the network processors may route these slow path packets to the appropriate control processor(s) for servicing. However, the rate at which slow path packets may be routed to control processors may exceed the control processors capability for processing them. That is, the control processors may be overloaded with packets to be serviced thereby causing the device, e.g., router, switch, to crash. Overloading of the control processors may be prevented at least in part by limiting the amount of traffic to be forwarded to the control processors. It would therefore be desirable to limit the amount of traffic being forwarded to control processors thereby preventing at least in part control processors from being overloaded. Method 500 is a method for limiting the amount of traffic being forwarded to control processor(s) 410.

Referring to FIG. 5, in conjunction with FIGS. 1 and 4, in step 501, control processor 410 may configure a table storing a listing of a plurality of slow path packets, e.g., packet implementing Border Gateway Protocol (BGP) routing protocol, packet implementing Open Shortest Path First (OSPF) routing protocol, Address Resolution Protocol (ARP) request, packet supporting Virtual Router Redundancy Protocol (VRRF), not handled by network processor 411 along with a plurality of associated actions to be performed on these slow path packets as described in greater detail below. It is noted that the table may be stored in non-volatile memory 460, ROM 416, disk unit 420 or other storage unit (not shown) in router 104. Control processor 410 may further configure a plurality of control blocks commonly referred to as "policer control blocks" in step 501. A policer control block may refer to code stored in a storage unit, e.g., non-volatile memory 460, ROM 416, disk unit 420 or other storage unit (not shown) in router 104, that is configured to measure a particular data transmission rate to a particular control processor 410 to determine if the data rate exceeds a user selectable bandwidth limit. In another embodiment, a policer control block may be implemented in hardware configured to measure a particular data transmission rate to a particular control processor 410 to determine if the data rate exceeds a user selectable bandwidth limit. Each policer control block may be associated with a particular type of slow path packet as well as a particular control processor 410. For example, a policer control block may be configured to measure the data rate of slow path packets implementing the BGP routing protocol to a particular control processor 410 in router 104. It is noted that each policer control block may be associated with multiple types of slow path packets as well as multiple control processors 410. It is further noted that step 501 may be performed by control processor 410 independently of steps 502–510.

In step 502, network processor 411 may receive a packet of data, e.g., Internet Protocol (IP) packet of data. A determination may be made by network processor 411 in step 503 as to whether the received packet is a slow path packet, e.g., Border Gateway Protocol (BGP) routing protocol, packet implementing Open Shortest Path First (OSPF) routing protocol, Address Resolution Protocol (ARP) request, packet supporting Virtual Router Redundancy Protocol (VRRF), and if so what type. In one embodiment, network processor 411 may be configured to determine if the received packet is a slow path packet including the type of slow path packet by reading the header of the received packet. If the packet cannot be handled by network processors 411, then the received packet may be deemed to be a slow path packet. For example, if the packet header contains an option implementing the BGP routing protocol, then the received packet may be deemed to be a slow path packet implementing the BGP routing protocol. If the packet can be processed by network processor 411, then the received packet may be deemed to be a fast path packet.

Referring to step 503, if the received packet is determined not to be a slow path packet, then network processor 411 may receive another packet of data in step 502. If the received packet is determined to be a slow path packet, then steps 504–510 may occur.

In step 504, network processor 411 may search the table configured independently by control processor 410 in step 501 to determine the appropriate action to be performed on the received packet. As stated above, the table may comprise a listing of a plurality of slow path packets not handled by network processor 411 along with a plurality of associated actions to be performed on those plurality of slow path packets. The actions that may be performed on the plurality of slow path packets are listed in steps 505–507. It is noted that other actions may be performed on the slow path packets not listed in steps 505–507 and that such actions would be recognized by an artisan of ordinary skill in the art. It is further noted that embodiments implementing such actions would fall within the scope of the present invention.

For example, if network processor 411 received a packet implementing OSPF routing protocol, then network processor 411 may determine that the received packet is a slow path packet implementing the OSPF routing protocol in step 403. Furthermore, network processor 411 may determine the appropriate action to perform on the packet implementing OSPF routing protocol in step 404. Network processor 411 may perform one of the following actions listed in steps 505–507 on the received packet.

One action that may be performed by network processor 411 on the received packet is to discard the received packet in step 505. Another action that may be performed by network processor 411, as indicated in step 506, is to discard the received packet as well as transmit a message to the appropriate control processor 410 indicating that the received packet was discarded. The message may include a summary of important information from the discarded packet. The appropriate control processor 410 may refer to the control processor 410 that would have processed the received packet had it been transmitted to a particular control processor 410.

Another action that may be performed by network processor 411, as indicated in step 507, is to transmit a packet length value to an appropriate policer control block. For example, the table configured in step 501 may have policer control blocks listed that are associated with particular types of slow path packets, e.g., slow path packet implementing the OSPF routing protocol. If the table configured in step 501 indicates to transmit the length of the slow path packet identified in step 503 to a particular policer control block, then network processor 411 may transmit the length of the slow path packet identified in step 503 to that particular policer control block in step 507.

In step 508, the policer control block may determine whether to transmit the received slow path packet to the control processor 410 associated with the policer control block. As stated above, each policer control block may be associated with a particular control processor 410. In one embodiment, the policer control block may be configured to determine if there is sufficient bandwidth for transmitting the received slow path packet to the associated control processor 410. The policer control block may determine if there is sufficient bandwidth for transmitting the received slow path packet by subtracting the number of bits of each packet transmitted from a user selectable number of bits, e.g., 100 megabits, within a particular period of time, e.g., one second, which may be representative of a particular bandwidth of the associated control processor 410. That is, the policer control block may determine if there is sufficient bandwidth for transmitting the received slow path packet by subtracting the number of bits of each packet transmitted from a count, e.g., 100 megabits, within a particular period of time, e.g., one second, which may be representative of a particular bandwidth of the associated control processor 410. If the count contains enough bits that covers the length of the received packet, the received packet may be transmitted by network processor 411 to the appropriate control processor 410 in step 509. That is, as long as the count contains enough bits that covers the length of the received packet, the associated control processor 410 has enough processing capacity to process the received packet. Typically, when a policer control block determines that the received packet may be transmitted to the appropriate control processor 410, the policer control block may be said to return a "green" value. When the policer control block returns a "green" value, network processor 411 may then transmit the received packet to the appropriate control processor 410. If the count does not contain enough bits to cover the length of the received packet, then the received packet may be discarded in step 510 by network processor 411. Typically, when a policer control block determines that the received packet may not be transmitted to the appropriate control processor 410, the policer control block may be said to return a "red" value. When the policer control block returns a "red" value, network processor 411 may then discard the received packet. By discarding packets that exceed the processing capacity of the appropriate control processor 410, overloading of the appropriate control processor 410 may at least in part be prevented.

It is noted that step 501 may be performed by one or more control processors 410 in router 401 and that steps 502–507 and 509–510 may be performed by one or more network processors 411 in router 401. It is further noted that step 508 may be performed by a policer control block. It is further noted that step 501 may be implemented independently of steps 502–510. It is further noted that method 500 may be executed in a different order presented and that the order presented in the discussion of FIG. 5 is illustrative. It is further noted that certain steps in FIG. 5 may be executed almost concurrently.

Although the system, computer program product method are described in connection with several embodiments, it is not intended to be limited to the specific forms set forth herein; but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

What is claimed is:

1. A method for preventing at least in part overloading of a control processor comprising the steps of:

configuring a table and a plurality of control blocks, wherein said table stores a listing of a plurality of slow path packets along with a plurality of associated actions to be performed on said plurality of slow path packets, wherein said slow path packets are packets that are redirected to one or more control processors to be processed from one or more network processors, wherein each of said plurality of control blocks is configured to measure a data transmission rate;

receiving a slow path packet of data; and searching said table to determine one of said plurality of actions to be performed on said received slow path packet;

wherein one of said plurality of actions is to transmit a value of a length of said received slow path packet to a control block corresponding to a type of said received slow path packet, wherein if said control block determines that transmitting said received slow path packet exceeds a user selectable bandwidth to an appropriate control processor then a network processor discards said received slow path packet thereby preventing at least in part overloading said appropriate control processor.

2. The method as recited in claim 1, wherein another one of said plurality of actions is to discard said received slow path packet.

3. The method as recited in claim 1, wherein another one of said plurality of actions is to discard said received slow path packet and transmit a message indicating discarding of said received slow path packet to said appropriate control processor.

4. The method as recited in claim 1, wherein if said control block determines that transmitting said received slow path packet does not exceed said user selectable bandwidth to said appropriate control processor then said network processor transmits said received slow path packet to said appropriate control processor.

5. The method as recited in claim 1, wherein said plurality of slow path packets comprises one or more of the following: packet implementing Border Gateway Protocol (BGP) routing protocol, packet implementing Open Shortest Path First (OSPF) routing protocol, Address Resolution Protocol (ARP) request, packet supporting Virtual Router Redundancy Protocol (VRRF).

6. A computer program product embodied in a machine readable medium for preventing at least in part overloading of a control processor comprising the programming steps of:

configuring a table and a plurality of control blocks, wherein said table stores a listing of a plurality of slow path packets along with a plurality of associated actions to be performed on said plurality of slow path packets, wherein said slow path packets are packets that are redirected to one or more control processors to be processed from one or more network processors, wherein each of said plurality of control blocks is configured to measure a data transmission rate;

receiving a slow path packet of data; and searching said table to determine one of said plurality of actions to be performed on said received slow path packet;

wherein one of said plurality of actions is to transmit a value of a length of said received slow path packet to a control block corresponding to a type of said received slow path packet, wherein if said control block determines that transmitting said received slow path packet exceeds a user selectable bandwidth to an appropriate control processor then a network processor discards said received slow path packet thereby preventing at least in part overloading said appropriate control processor.

7. The computer program product as recited in claim 6, wherein another one of said plurality of actions is to discard said received slow path packet.

8. The computer program product as recited in claim 6, wherein another one of said plurality of actions is to discard said received slow path packet and transmit a message indicating discarding of said received slow path packet to said appropriate control processor.

9. The computer program product as recited in claim 6, wherein if said control block determines that transmitting said received slow path packet does not exceed said user selectable bandwidth to said appropriate control processor then said network processor transmits said received slow path packet to said appropriate control processor.

10. The computer program product as recited in claim 6, wherein said plurality of slow path packets comprises one or more of the following: packet implementing Border Gateway Protocol (BGP) routing protocol, packet implementing Open Shortest Path First (OSPF) routing protocol, Address Resolution Protocol (ARP) request, packet supporting Virtual Router Redundancy Protocol (VRRF).

11. A system, comprising:

a network processor;

a control processor coupled to said network processor, wherein said control processor is configured to process slow path packets, wherein said slow path packets are redirected from said network processor to said control processor to be processed by said control processor; and a memory unit coupled to said control processor and said network processor, wherein said memory unit is operable for storing a computer program for preventing at least in part overloading of said control processor;

wherein said control processor, responsive to said computer program, comprises:

circuitry operable for configuring a table and a plurality of control blocks, wherein said table stores a listing of a plurality of slow path packets along with a plurality of associated actions to be performed on said plurality of slow path packets, wherein each of said plurality of control blocks is configured to measure a data transmission rate;

wherein said network processor, responsive to said computer program, comprises:

circuitry operable for receiving a slow path packet of data; and circuitry operable for searching said table to determine one of said plurality of actions to be performed on said received slow path packet;

wherein one of said plurality of actions is to transmit a value of a length of said received slow path packet to a control block corresponding to a type of said received slow path packet, wherein if said control block determines that transmitting said received slow path packet exceeds a user selectable bandwidth to said control processor then said network processor discards said received slow path packet thereby preventing at least in part overloading said control processor.

12. The system as recited in claim 11, wherein another one of said plurality of actions is to discard said received slow path packet.

13. The system as recited in claim 11, wherein another one of said plurality of actions is to discard said received slow path packet and transmit a message indicating discarding of said received slow path packet to said control processor.

14. The system as recited in claim 11, wherein if said control block determines that transmitting said received slow path packet does not exceed said user selectable bandwidth to said control processor then said network processor transmits said received slow path packet to said control processor.

15. The system as recited in claim 11, wherein said plurality of slow path packets comprises one or more of the following: packet implementing Border Gateway Protocol (BGP) routing protocol, packet implementing Open Shortest Path First (OSPF) routing protocol, Address Resolution Protocol (ARP) request, packet supporting Virtual Router Redundancy Protocol (VRRP).

* * * * *